US010884117B2

(12) United States Patent
Formont et al.

(10) Patent No.: US 10,884,117 B2
(45) Date of Patent: Jan. 5, 2021

(54) RECONFIGURABLE IMAGING DEVICE

(71) Applicant: THALES, Courbevoie (FR)

(72) Inventors: Stéphane Formont, Elancourt (FR); Patrick Garrec, Merignac (FR); Richard Montigny, Merignac (FR)

(73) Assignee: THALES, Courbevoie (FR)

( * ) Notice: Subject to any disclaimer, the term of this patent is extended or adjusted under 35 U.S.C. 154(b) by 199 days.

(21) Appl. No.: 16/155,766

(22) Filed: Oct. 9, 2018

(65) Prior Publication Data

US 2019/0120956 A1    Apr. 25, 2019

(30) Foreign Application Priority Data

Oct. 19, 2017    (FR) ..................... 17 01088

(51) Int. Cl.
| | |
|---|---|
| *G01S 13/90* | (2006.01) |
| *G01S 13/86* | (2006.01) |
| *G01S 19/51* | (2010.01) |
| *G01S 17/08* | (2006.01) |
| *G01S 13/87* | (2006.01) |
| *B64C 39/02* | (2006.01) |

(52) U.S. Cl.
CPC ............ *G01S 13/90* (2013.01); *B64C 39/024* (2013.01); *G01S 13/865* (2013.01); *G01S 13/867* (2013.01); *G01S 13/87* (2013.01); *G01S 17/08* (2013.01); *G01S 19/51* (2013.01); *B64C 2201/123* (2013.01); *B64C 2201/127* (2013.01); *B64C 2201/145* (2013.01); *B64C 2201/148* (2013.01)

(58) Field of Classification Search
CPC combination set(s) only.
See application file for complete search history.

(56) References Cited

U.S. PATENT DOCUMENTS

| | | |
|---|---|---|
| 2008/0081556 A1 | 4/2008 | Robinson |
| 2012/0226470 A1* | 9/2012 | Seymour ............... G01S 13/867 702/150 |
| 2014/0241239 A1 | 8/2014 | Chang |
| 2016/0259044 A1 | 9/2016 | Chen et al. |
| 2018/0017662 A1* | 1/2018 | Colentier ................. G01S 5/16 |
| 2018/0046187 A1* | 2/2018 | Martirosyan ........ G05D 1/0094 |
| 2018/0266887 A1* | 9/2018 | Frank ...................... H02S 50/15 |
| 2019/0250601 A1* | 8/2019 | Donahoe ................ G05D 1/101 |
| 2019/0378423 A1* | 12/2019 | Bachrach ............. G05D 1/0088 |

FOREIGN PATENT DOCUMENTS

WO    2017/048339 A1    3/2017

OTHER PUBLICATIONS

Amann, et al., "Laser ranging: a critical review of usual techniques for distance measurement", Opt. Eng. 40(1), pp. 10-19, Jan. 2001.

* cited by examiner

*Primary Examiner* — Mamadou L Diallo
(74) *Attorney, Agent, or Firm* — BakerHostetler

(57) ABSTRACT

The device includes at least: a set of optical and/or electro-magnetic elementary sensors which are able to fly and means of command for piloting the flight of the sensors; processing means; a communication link between each sensor and the processing means; to produce an image of a given scene, the sensors fly while forming an array whose configuration is controlled by the command means, the processing means fusing the signals provided by the sensors with a view to delivering an image of the scene, the signals provided being representative of the scene.

13 Claims, 2 Drawing Sheets

RECONFIGURABLE IMAGING DEVICE

This application claims priority to foreign French patent application No. FR 1701088, filed on Oct. 19, 2017, the disclosure of which is incorporated by reference in its entirety.

FIELD OF THE INVENTION

The present invention relates to a reconfigurable imaging device.

The field applies in particular for producing images of scenes. These images can be optical images and/or electromagnetic images. The images are acquired by means of several elementary sensors placed in an array, as is the situation for example with an electronic-scanning antenna in the case of electromagnetic images, or with a camera array in the case of optical images.

BACKGROUND

A problem to be solved relates to the possibility of dynamically reorganizing an imaging system, by modifying the mutual positions of the elementary antennas in the case of an electronic-scanning antenna, or the mutual position of various cameras, in a dynamic manner, as a function of the type of images to be acquired so as to tailor the resolution to the objects that it is sought to image.

The arraying of elementary sensors is known. Electronic-scanning antennas operate on this principle and are used in the field of telecommunications and radars. An electronic-scanning antenna is thus generally an array antenna whose radiating elements are organized according to a periodic geometry making it possible to work in a very particular frequency range. The spacing between radiating elements is prescribed by construction and therefore may not be modified.

For optical imaging sensors arrayed for the acquisition of images of large size, the finding is identical. The array of sensors is generally prescribed by construction.

These radar or optical imaging systems do not make it possible to deal with the problem.

SUMMARY OF THE INVENTION

An aim of the invention is in particular to allow the production of a reconfigurable imaging system which adapts to the various types of images to be acquired. For this purpose, the subject of the invention is an imaging device intended to produce images of scenes, comprising at least:
- a set of optical and/or electromagnetic elementary sensors which are able to fly and means of command for piloting the flight of the said sensors;
- processing means;
- a communication link between each sensor and the said processing means; to produce an image of a given scene, the said sensors fly while forming an array whose configuration is able to be modified during the flight of the said sensors, the said configuration being controlled by the said command means, the said processing means fusing the signals provided by the said sensors with a view to delivering an image of the said scene, the said signals provided being representative of the said scene.

The said electromagnetic sensors are for example radar sensors making it possible to produce images of SAR type.

In a possible embodiment, the said sensors fly by means of carriers, each carrier being equipped at least with a sensor. Each carrier is for example equipped with an optical sensor and with an electromagnetic sensor.

The carriers can be drones or balloons for example.

In a possible embodiment, the said processing means are installed on a single of the said carriers.

In another possible embodiment, the said processing means are shared over several of the said carriers.

In another possible embodiment, the said processing means are installed in a fixed or mobile ground station.

The said command means comprise for example systems of GPS type for measuring the mutual relative positions of the sensors.

The said command means comprise for example means for measuring distances to the sensors by emission of a laser beam towards the various sensors, the relative positions between the sensors being deduced from these distances. Advantageously, the laser beam is for example used as line of communication between the said command means and the said sensors.

In a possible embodiment, the said sensors being radar sensors, they are positioned in flight at a distance apart substantially equal to half the radar wavelength.

BRIEF DESCRIPTION OF THE DRAWINGS

Other characteristics and advantages of the invention will become apparent with the aid of the description which follows, given in relation to appended drawings which represent:

FIG. 3, another possible configuration of the array of sensors, disposed wedge-like.

DETAILED DESCRIPTION

Figure 1:
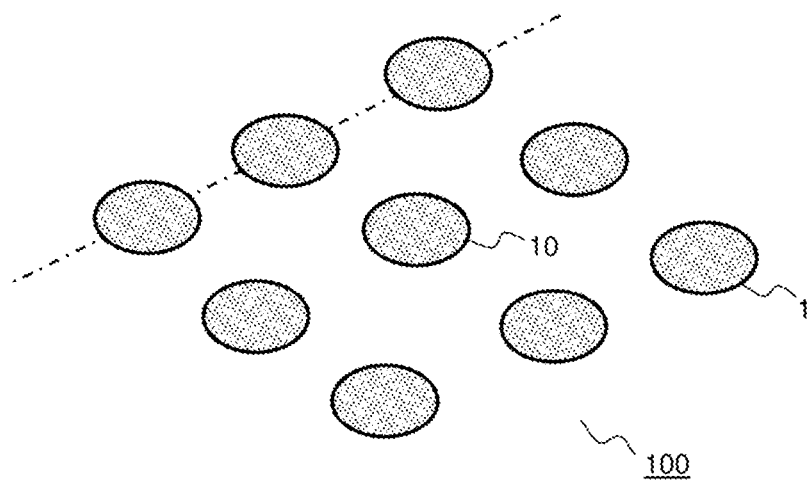
FIG. 1, an illustration of the principle of producing a device according to the invention, the said device being presented in a particular configuration of sensor array.

FIG. 1 illustrates the principle of producing a device according to the invention.

The solution proposed by a device according to the invention is based on a set of optical elementary sensors and/or electromagnetic sensors 1 (RF sensors). These sensors fly in space while forming an array 100, by means of mobile carriers or platforms on which they are installed.

The position of the elementary sensors with respect to one another defines the performance of the complete device. By modifying the positions of the sensors it is possible to modify the performance of the device accordingly. Advantageously, this performance can be adapted dynamically to the scene of which it is necessary to acquire an image, and to the objects sought, as will be more particularly described hereinafter.

The carriers on which the sensors are installed are for example drones. FIG. 1 presents, by way of example, a set of drones flying in a swarm and each carrying an optical or electromagnetic imaging sensor 1.

The electromagnetic sensors comprise for example simple or multiple antennas operating on one or more frequency bands, or arrays of antennas.

By reorganizing the relative positions of the drones with respect to one another, it is possible to dynamically modify the properties of the arrays of sensors 1, and therefore to modify certain parameters such as the spatial or angular resolution.

The signals acquired by the various sensors are recombined to form an image with resolution improved according to the methods known to the person skilled in the art. For this purpose, processing means receive the signals acquired by all the sensors 1, these processing means recombining these signals to form the improved image. In the case where the swarm comprises at one and the same time optical sensors and electromagnetic sensors, the processing means fuse the optical signals and the radar signals, the image obtained is then the result of the superposition of an optical image and of an RF image. The construction of the image by the processing means also requires that the relative positions of the drones be known. Various solutions for measuring these positions will be described hereinafter.

Several variant embodiments make it possible to implement this solution, both at the level of the carriers (the drones for example) and at the level of the support of the processing means.

As regards the sensors, the latter can be equipped with emission means for emitting signals towards the processing means, these emission means can be incorporated into the sensors or installed on the carrier of each sensor, the drone in this instance. These emission means can be supplemented with reception means, in particular to receive the carriers' command signals, more particularly to control their relative positions. More generally, each drone comprises a communication link, possibly incorporated into the sensors, communicating with a platform incorporating the image processing means and means of remote command of the drones. These latter means command the flight of the carriers and make it possible to obtain the various shapes that one wishes to adapt to the scene.

The sensors used can be low-cost sensors. Commercially available 25-GHz sensors may for example be used. These sensors can even incorporate an emission and reception circuit ensuring the link with the processing means. These sensors also incorporate an analogue-digital converter (ADC) in such a way that the signal transmitted to the processing is already digitized.

As regards the processing means, image means and/or control means, the latter can be installed on one of the drones 10, on an airborne support different from a carrier or else in a fixed or mobile ground station. Stated otherwise, the above-mentioned platform can be one of the carrier drones, another aircraft, or a fixed or mobile ground station. In a variant embodiment, instead of providing for the installation of the processing means on a single drone, the processing means are shared over several drones, more precisely they are distributed over several drones.

To dynamically reconfigure the array of sensors 1 and control their relative positions, it is necessary to be able to know these positions that is to say ultimately the position of their carriers.

In a particular embodiment, in order to precisely know the relative positions of the drones, embedded on board each drone are location means enabling it to be referenced with respect to its neighbours. These means are for example systems of GPS type, or optical telemetry systems allowing precise measurement of the distances between drones.

Solutions which make it possible to measure distances are for example:
measurements based on flight time, the precision being of the order of a centimetre;
optical heterodyne measurements, the precision possibly attaining a hundred microns over distances of up to 20 metres (see for example the article "Laser ranging: a critical review of usual techniques for distance measurement, Markus-Christian Amann, Thierry Bosch, Marc Lescure, Risto Myllyla, Marc Rioux, in Opt. Eng. 40(1) 10-19 (January 2001)"). The principle consists in using a laser source whose oscillation frequency is tailored to the distance to be measured.
measurements of optical FMCW radar type, as opposed to an electromagnetic FMCW the resolution of which is lower. In optics the interest rests on the possibility of carrying out more significant frequency scans than in RF, and therefore, of having access to sub-centimetric resolutions.

These measurement principles apply advantageously for the array configuration of FIG. 1 adapted to 2D imaging.

They are also applicable in 3D, where the drones are arrayed according to a three-dimensional network. In addition to allowing access to the distance, this makes it possible to afford access to the mutual attitude of the various drones, or to improve the precision of the measurements.

Mutual location of the various aircraft makes it possible to tailor the beams formed as a function of the working frequency, and to determine the ambiguities associated with the fact that the antennas are not spaced apart by a fraction of the wavelength but several wavelengths.

The measurements of distances between drones can also be made using lasers to allow stereoscopy measurements. More precisely in this case the command means comprise means for measuring distances to the drones by emission of a laser beam towards the various drones. The relative positions between the drones can be deduced on the basis of these measured distances.

Advantageously, these lasers can moreover serve as communication link between the drones and the processing means.

Yet another solution consists in using methods of transmission with ultra wide frequency band to perform precise measurements. These methods make it possible to re-circulate the information and to improve the distance measurements.

It is also possible to use the solution developed in patent application FR1700340 to generate reference light spots and allow relative geolocation of the drones.

The measurement means described previously are incorporated into the means of command of the flight of the drones. On the basis of the measurements of relative distances or positions, the command means pilot the drones remotely so as to modify or maintain the shape of the flying array. They also command the speed of the drones, as a function in particular of the image to be acquired.

Knowing the relative positions of the cameras and the angles of view, it is possible to reconstruct 3D scenes. Indeed, each sensor sees a projection of the scene and the knowledge of the relative positions of the drones makes it possible to reconstruct the image.

In the field of radar, the sensors can be radar sensors of SAR (Synthetic Aperture Radar) type, more particularly radars making it possible to produce images of SAR type. The methods for constructing the improved image are identical.

The number of drones forming the swarm presented in FIG. 1 can be significant. The more significant the number of drones, the more precise the image obtained. The drones used can be low-cost drones, thus making it possible to use a lot of drones. In practice, the swarm comprises at least four drones for example. In the example of FIG. 1, the device comprises nine drones.

In the case where the imaging is at one and the same time optical and electromagnetic, that is to say where the swarm comprises optical sensors and electromagnetic sensors, two embodiments are possible. In a first embodiment, each drone carries at one and the same time an optical sensor and an electromagnetic sensor. In another embodiment, each carrier carries a single sensor, optical or electromagnetic. In this case, it is possible to form an optical array and an electromagnetic array, the two arrays being intertwined. This is for example carried out by alternating optical sensor and electromagnetic sensor along each row or column of the array.

Figure 2:
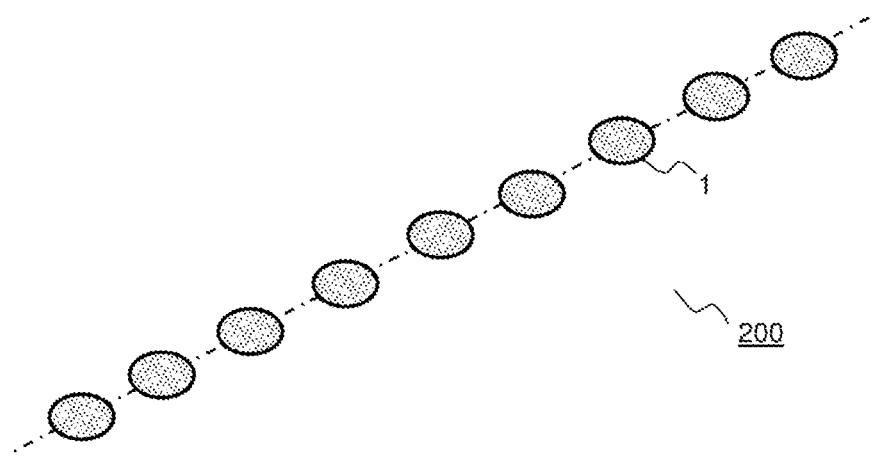
FIG. 2, another possible configuration of the array of sensors, disposed along a line.

FIG. 2 presents another possible configuration of the array of sensors 200. In this case, the sensors are arranged as a line, in particular for 1D imaging. In this configuration, the sensors are regularly distributed along the line.

Figure 3:
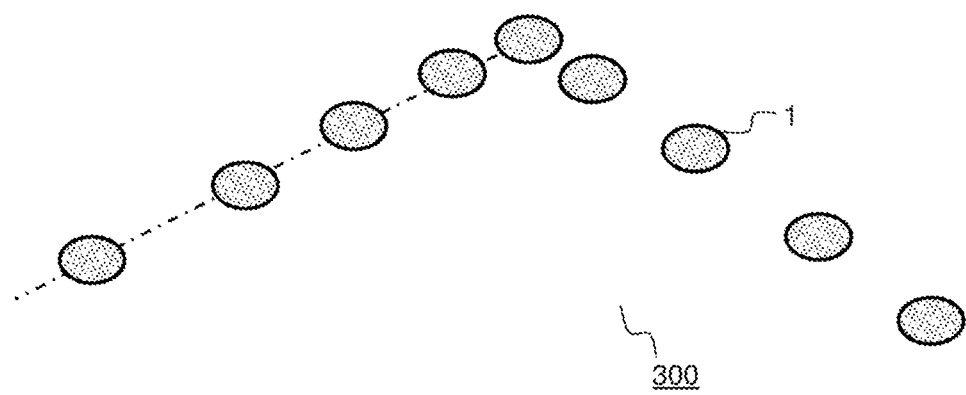

FIG. 3 presents an exemplary configuration, or exemplary array 300, where the sensors are arranged wedge-like, along two lines, and where the sensors are not regularly distributed over the lines, in particular to perform direction-of-arrival measurements.

One and the same device according to the invention can go from a configuration according to FIG. 1, to a configuration according to FIG. 2 or FIG. 3 and vice-versa. Advantageously, a device according to the invention can take all sorts of configuration in the course of one and the same mission.

It is possible to produce a device according to the invention operating in all the operational frequency bands, in particular the HF V/UHF X, Ku, K, Ka and millimetric bands.

It is also possible to use V/UHF bands and to install antennas of yagi type on the drones. In this case the creation of a low-frequency antenna is possible with the advantages consisting in having a mobile antenna, steerable in the desired directions.

For the low-band solutions, it is possible to position the drones at distances of the order of half the radar wavelength and thus place the antennas in an array. The detections of objects of very low radar cross section can thus be advantageously performed.

It is also possible to use several frequency bands at the same time and to correlate the information.

An imaging device according to the invention comprises many advantages. In particular, the invention offers:
  the possibility of dynamically reorganizing the characteristics of the arrays of imaging sensors;
  the possibility of modifying the performance so as to focus the image on a particular point, or to acquire images of large scenes;
  the possibility of producing all particular shapes of array (2D chessboard, 3D, line, cross, wedge . . . );
  great robustness, in particular if a sensor is out of service, it is possible to reconfigure the array so as to cancel the effect of its out-of-service state;
  economy of production, indeed the cost of an elementary drone is low, and it is possible to produce large-size arrays.

In the exemplary embodiments described of the invention, the carriers are drones. It is of course possible to use other carriers provided that it is possible to create an array of, optical and/or electromagnetic, flying sensors whose relative positions in flight can be adapted. It is thus possible to use balloons.

The invention claimed is:

1. An imaging device intended to produce images of scenes, wherein the said device comprises at least:
   a set of optical and/or electromagnetic elementary sensors which are able to fly and means of command for piloting the flight of the said sensors;
   processing means;
   a communication link between each sensor and the said processing means;
to produce an image of a given scene, the said sensors fly while forming an array whose configuration is able to be modified during the flight of the said sensors, the said configuration being controlled by the said command means, the said processing means fusing the signals provided by the said sensors with a view to delivering an image of the said scene, the said signals provided being representative of the said scene.

2. The device according to claim 1, wherein the said electromagnetic sensors are radar sensors making it possible to produce images of SAR type.

3. The device according to claim 1, wherein the said sensors fly by means of carriers, each carrier being equipped at least with a sensor.

4. The device according to claim 3, wherein each carrier is equipped with an optical sensor and with an electromagnetic sensor.

5. The device according to claim 3, wherein the carriers are drones.

6. The device according to claim 3, wherein the carriers are balloons.

7. The device according to claim 3, wherein the said processing means are installed on a single of the said carriers.

8. The device according to claim 3, wherein the said processing means are shared over several of the said carriers.

9. The device according to claim 1, wherein the said processing means are installed in a fixed or mobile ground station.

10. The device according to claim 1, wherein the said command means comprise systems of GPS type for measuring the mutual relative positions of the sensors.

11. The device according to claim 1, wherein the said command means comprise means for measuring distances to the sensors by emission of a laser beam towards the various sensors, the relative positions between the sensors being deduced from these distances.

12. The device according to claim 11, wherein the said laser beam is used as line of communication between the said command means and the said sensors.

13. The device according to claim 1, wherein the said sensors being radar sensors, they are positioned in flight at a distance apart substantially equal to half the radar wavelength.

* * * * *